(12) United States Patent
Cooley

(10) Patent No.: US 7,941,437 B2
(45) Date of Patent: May 10, 2011

(54) BAYESIAN SURETY CHECK TO REDUCE FALSE POSITIVES IN FILTERING OF CONTENT IN NON-TRAINED LANGUAGES

(75) Inventor: Shaun Cooley, El Segundo, CA (US)

(73) Assignee: Symantec Corporation, Mountain View, CA (US)

(*) Notice: Subject to any disclaimer, the term of this patent is extended or adjusted under 35 U.S.C. 154(b) by 928 days.

(21) Appl. No.: 11/844,938

(22) Filed: Aug. 24, 2007

(65) Prior Publication Data

US 2009/0055412 A1    Feb. 26, 2009

(51) Int. Cl.
*G06F 7/00*        (2006.01)
*G06F 17/30*    (2006.01)

(52) U.S. Cl. ........................................ 707/754
(58) Field of Classification Search .................. 707/754
See application file for complete search history.

(56) References Cited

U.S. PATENT DOCUMENTS

| | | | |
|---|---|---|---|
| 7,089,241 B1 | 8/2006 | Alspector et al. | |
| 2005/0216564 A1 | 9/2005 | Myers et al. | |
| 2005/0262210 A1* | 11/2005 | Yu ................................ | 709/206 |
| 2006/0053203 A1* | 3/2006 | Mijatovic ...................... | 709/206 |

OTHER PUBLICATIONS

Mo, et al.; "Multi-agent Interaction Based Collaborative P2P System for Fighting Spam"; Dec. 1, 2006; IEEE/WIC/ACM Int'l Conference on Intelligent Agent Technology; ISBN 978-07695-2748-2, pp. 428-431.

Chandra, et al.; "Ways to Evade Spam Filters and Machine Learning as a Potential Solution"; Oct. 1, 2006; IEEE Int'l Symposium on Communications and Information Technologies.

Carpinter, et al.; "Tightening the net: A review of current and next generation spam filtering tools"; Nov. 21, 2006; Computers & Security, vol. 25, No. 8, Elsevier Science Publishers, ISSN: 0167-4048, pp. 566-578.

European Search Report for Application No. EP08014069, 12 pages, dated Dec. 2, 2008.

Translation of Chinese Office Action in Co-pending Chinese Counterpart Application, dated Aug. 9, 2010, 6 pages.

* cited by examiner

*Primary Examiner* — John R. Cottingham
*Assistant Examiner* — Nicholas E Allen
(74) *Attorney, Agent, or Firm* — Brill Law Office; Jeffrey Brill

(57) ABSTRACT

A Bayesian spam filter determines an amount of content in incoming email messages that it knows from training. If the filter is familiar with a threshold amount of the content, then the filter proceeds to classify the email message as being spam or legitimate. On the other hand, if not enough of the words in the email are known to the filter from training, then the filter cannot accurately determine whether or not the message is spam. In this case, the filter classifies the message as being of type unknown. Different threshold metrics can be used, such as the percentage of known words, and the percentage of maximum correction value used during processing. This greatly improves the processing of emails in languages on which the filter was not trained.

17 Claims, 1 Drawing Sheet

BAYESIAN SURETY CHECK TO REDUCE FALSE POSITIVES IN FILTERING OF CONTENT IN NON-TRAINED LANGUAGES

TECHNICAL FIELD

This invention pertains generally to Bayesian filtering of electronic content, and more specifically to utilizing a surety check in Bayesian spam email filtering to reduce false positives when processing emails in non-trained languages.

BACKGROUND ART

Current statistical spam detection techniques rely heavily on their ability to find known words during classification of electronic messages. The authors of spam emails have become aware of this, and often include nonsense words in their messages. The use of nonsense words to spoof spam detection takes two primary forms. The first is the insertion of a small number (e.g., one or two) of nonsense words into emails. This is used to thwart simple hash detection of duplicate copies of a single message being sent to many users at one internet service provider. By inserting different nonsense words into each copy of the message, simple hash detection routines are not able to determine that the messages are duplicates. This form of nonsense word insertion is referred to as a "hash buster." The second form consists of inserting a larger number of nonsense words into emails, where the words as a group cause misclassification of the overall message.

Spam classification engines analyze the content of email messages and attempt to determine which emails are spam based on various statistical techniques, such as Bayesian analysis. Bayesian spam filtering is based on established probabilities of specific words appearing in spam or legitimate email. For example, the nonsense words described above, as well as certain words such as "Viagra", "Refinance", "Mortgage" etc, frequently appear in spam, and yet rarely or less frequently appear in legitimate email. Thus, the presence of such terms increases the probability of an email being spam. A Bayesian spam classification engine has no inherent knowledge of these probabilities, but instead establishes them by being trained on a set of email messages.

When classifying documents using a statistical method, such as the Bayesian method, the classifications output is only as good as the input. This leads to a problem when a statistical classifier is presented with a message in a language in which the classifier was not trained (for example, when a classifier trained in English is attempting to classify a German document). More specifically, it has become common for spammers to insert words or phrases in foreign languages in spam emails, as opposed to or in addition to nonsense words. This often results in certain common foreign language words (e.g., "el", "los", "der", "die", "und", etc.) becoming associated with spam by classification engines. Because these words appear in many spam emails but virtually no legitimate emails written in English, a Bayesian classification engine trained on an English language data set will interpret their presence in an email message is a strong indication of the message comprising spam.

In the past, the issue of content in a non-trained language has been addressed in two different ways. One solution is to use a secondary classifier that is capable of determining the language of a document. The input to the Bayesian spam filter is then limited to content in languages on which it has been trained. The second solution is for the Bayesian filter to attempt to classify every document, regardless of language.

The first solution is expensive, both in terms of dollars and computing efficiency. In order to classify each document by language, expensive language classification engines must be licensed or built simply to determine if a spam engine should inspect an incoming message. Furthermore, classifying each incoming email with an additional engine is time consuming, and slows down the spam filtering process.

In the context of spam, the later solution typically leads to extremely high false positive rates when filtering emails in languages on which the Bayesian filter has not been trained. As noted above, very common words in non-trained foreign languages were likely prevalent in the training data in spam only. For example, when training on an English email set, words like "und" and "der" appear frequently in spam and almost never in legitimate email. However, when processing German email, these words appear in almost every message, whether spam or legitimate. Thus, a classifier trained in English but not German would classify all or most German email messages as spam.

It would be desirable to be able to avoid such an excessive false positive rate when processing content in a language on which the Bayesian filter has not been trained, without having to use an expensive secondary classifier that is capable of determining the language of a document.

SUMMARY

Special processing allows vastly improved Bayesian spam filtering of email messages in foreign languages. A Bayesian spam filter determines an amount of content in incoming email messages that it knows from training. If the filter is familiar with a threshold amount of the content, then the filter proceeds to classify the email message as being spam or legitimate. On the other hand, if not enough of the words in the email are known to the filter from training, then the filter cannot accurately determine whether or not the message is spam. This will generally be the case when the email message is written in a language for which the filter was not trained. In this case, the filter classifies the message as being of type unknown. Different threshold metrics can be used as desired, such as the percentage of words in an email that are known, and the percentage of a maximum correction value that was used during Bayesian processing of an email.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
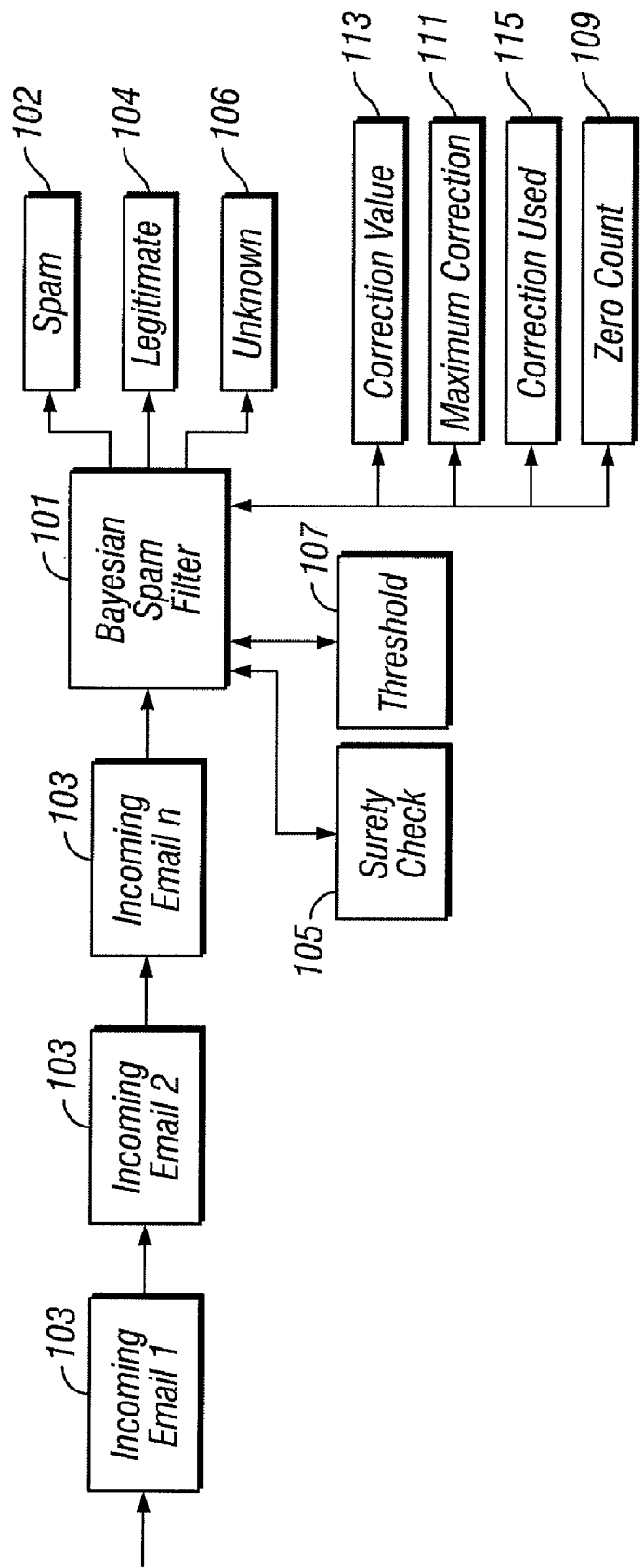
FIG. 1 is a block diagram illustrating a system in which a surety check is utilized in Bayesian spam email filtering to reduce false positives when processing emails in non-trained languages, according to some embodiments of the present invention.

The FIGURES depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 in which a surety check 105 is utilized in Bayesian spam email filtering to reduce false positives when processing emails in non-trained languages, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a Bayesian spam filter 101 receives incoming email messages 103. The implementation mechanics of a standard Bayesian spam filter 101 are known to those of ordinary skill in the relevant art, and the usage thereof within the context of the present invention will be readily apparent to one of such a skill level in light of this specification. During the process of utilizing Bayesian methodology to review incoming emails 103, the Bayesian spam filter 101 analyzes the content of these email messages 103. Above and beyond standard Bayesian processing, the Bayesian spam filter 101 performs a surety check 105 on the incoming emails 103. A surety check 105 herein refers to an analysis to determine whether more than a threshold 107 amount of the content is known. For example, to perform a surety check 105 on an incoming email message 103, the Bayesian spam filter 101 analyzes the content of that email message 103, and determines which words therein are known to the Bayesian spam filter 101, from the data on which it has been trained. In other words, if a specific word was encountered by the Bayesian spam filter 101 during its training and associated with a categorization probability, then that word is known. If a word has not been encountered by the Bayesian spam filter 101 during training and is thus not associated with given probabilities, that word is not known. As described in greater detail below, the amount of unknown content in an email 103 assists the Bayesian spam filter 101 in categorizing that email 103.

More specifically, if more than a threshold 107 amount of the content of the email 103 is not known, the Bayesian spam filter 101 classifies the document as being of an unknown 106 type. In other words, because too much of the content is not known to the filter 101, it cannot reliably categorize the email 103 as being spam 102 or legitimate 104. Since the filter 101 has not been trained on enough of the words in the email 103, it cannot draw reliable conclusions as to the nature of the email 103 based on its probability data concerning the words it does know. On the other hand, if Bayesian spam filter 101 determines that less than a threshold 107 amount of the content of the email 103 is known, then the filter 101 has enough information to perform a standard Bayesian probability classification of the document.

For example, if a Bayesian spam filter 101 has been trained on an English email set but not a German one, the filter 101 will falsely classify all or most German email 103 as spam 102, because most German words are unknown to the filter 101, whereas a few common German words (e.g., the definite article and common conjunctions) are associated with a high probability of spam 102, as they were present only in spam 102 in the English language training data. The surety check 105 will flag the fact that the filter 101 does not know most of the words in the German language email, and thus that rather than comprising spam 102 it comprises unknown content, about which the filter 101 cannot draw a conclusion. On the other hand, English language spam 102 containing a few German words will still be flagged as spam 102, because the filter 101 will know most of the (English) words in the email 103, and hence substantively categorize the email 103.

Various forms of surety checks 105 can be performed according to different embodiments of the present invention. In one embodiment, the filter 101 simply calculates the percentage of words in an incoming email message 103 that are known from Bayesian filter training. In that embodiment, the filter 101 proceeds to substantively categorize the email 103 only if a requisite amount of the content is known. It is of course to be understood that the threshold 107 to use is a variable design parameter. In one embodiment, 85% is used as a known word threshold 107, although other values are used in other embodiments (e.g., 80%, 90%, 95% etc.)

In some embodiments, the surety check 105 used for an email message 103 is the percentage of a maximum correction value 111 utilized during the Bayesian filtering of the email message 103. In order to understand correction generally and maximum correction specifically, note first that in Bayesian filtering, a special probability value is used by the filter 101 for words which were not encountered during training. Without adjustment, the presence of one or more words in an email 103 not encountered during training would disproportionately influence the Bayesian classification of that email 101. For this reason, Bayesian processing can use a default probability for such a word. Such a default probability is used in many embodiments of the present invention, including but not limited to those which employ a percentage of maximum correction 111 used as a surety check 105.

The default probability to use during Bayesian processing for words not encountered in training is referred to herein as the zero count 109. The zero count 109 can be calculated in different ways in different embodiments of the present invention as desired. In one embodiment, the zero count 109 is calculated according to the formula in Table 1 below, wherein TotalWords represents the number of words from the training set:

TABLE 1

$$\text{ZeroCount} = \ln\left(\frac{1}{10 \cdot \text{TotalWords}}\right)$$

Continuing with the explanation of correction, note that in Bayesian classification generally, when classifying a list of words (e.g., the words in an email 103) each category (e.g., spam 102 and legitimate email 104) is given a raw score by calculating the sum of P(Category | Word) (that is, the probability that the document is of Category given the occurrence of Word) for each word in the list. During this step, an error (correction) value 113 can also be calculated which can be used to prevent a single word from overpowering the rest of the words in the document (e.g., the email message 103). Such a correction value 113 is used in many embodiments of the present invention.

The correction value 113 can be calculated in different ways as desired. In some embodiments of the present invention, the correction value is calculated according to the mathematics in Table 2 below:

TABLE 2

CC = CategoryCount
WC = WordCount $$\text{RawScore} = \sum_{i=1}^{WC} P(\text{Category} \mid \text{Word}_i) \cdot \text{Count}_i$$

$$\text{Correction} = \sum_{i=1}^{WC} (\max(P(\text{Category}_{1,2,\ldots,n} \mid \text{Word}_i)) - \ln(CC)) \cdot \text{Count}_i$$

Continuing with the discussion of maximum correction, in some embodiments the Bayesian filter 101 calculates the greatest possible correction 111 that could occur for a given email message 103. This can be calculated in different ways as desired. In some embodiments of the present invention, the maximum correction value 111 for an email message 103 is calculated according to the formula in Table 3 below:

TABLE 3

CorrectionMax = ZeroCount/2 * WordsInEmail

Finally, the amount of the maximum correction actually used 115 can then be calculated by dividing the Correction 113 (e.g., as calculated according to Table 2) by Correction-Max 111 (e.g., as calculated according to Table 3). It is this result 115 that is used in some embodiments of the invention during the surety check 105 as a threshold 107 metric. Of course, the specific threshold 107 to use is a variable design parameter. In some embodiments, if the correction used 115 in greater than 95% of the maximum, the filter 101 adjutacates the email as being of type unknown 106. Other threshold 107 values are also possible (e.g., >98%, >90% etc.)

In some embodiments of the present invention, multiple threshold 107 metrics are examined by the filter 101. For example, in one embodiment, the Bayesian filter 101 only adjudicates an email as being of type unknown 106 if a) less than 15% of the words in the email are known and b) the correction used 115 by the Bayesian filter 101 on the email 103 was greater than 95% of the maximum 111. Other specific threshold 107 values and metrics can be used in other embodiments as desired.

The use of a surety check 105 within the context of a Bayesian spam filter 101 works very well. It also adapts very quickly to additional training executed at a deployment point, thus allowing a publisher to ship an anti-spam product after only training it on English language email messages 103. As the product is used in an environment based on a non-trained language, the Bayesian filter 101 quickly becomes trained on that language (e.g., via auto outbound training and reclassification of inbound messages 103); and thus the surety check 105 no longer declares emails written in those language as being of type unknown 106.

The present invention also allows anti-spam solutions to be rapidly deployed in regions for which training data is not available. In addition, the present invention allows a publisher of anti-spam software to save money by not licensing expensive language classification engines simply to determine if a spam engine should inspect a message 103.

It is to be further understood that although this specification has been discussing classifying email messages 103 as spam 102, legitimate 104 or unknown 106, the present invention is in no way so limited. Although spam classification is a great use for the present invention, it can be utilized within the context of the Bayesian classification of any document type into any number of appropriate categories.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for reducing false classifications during Bayesian filtering, the method comprising the steps of:

within a context of Bayesian filtering, analyzing content of at least one document to be classified;

determining whether more than a threshold amount of the content of the at least one document is known wherein determining whether more than a threshold amount of the content of the at least one document is known further comprises performing at least one step from a group of steps consisting of:

determining a percentage of words of the at least one document that are known from Bayesian filter training; and determining a percentage of a maximum correction value utilized during Bayesian filtering of the at least one document; and classifying the document responsive to results of the determination.

2. The method of claim 1 wherein classifying the document responsive to results of the determination further comprises performing a step from a group of steps consisting of:

responsive to determining that more than a threshold amount of the content of the document is not known, classifying the document as being of an unknown type; and responsive to determining that less than a threshold amount of the content of the document is not known, classifying the document according to results of standard Bayesian filtering.

3. The method of claim 1 wherein determining a percentage of a maximum correction value utilized during Bayesian filtering of the at least one document further comprises:
calculating the maximum correction value for the at least one document as a function of a zero count value and a number of words in the at least one document; and
calculating a percentage of the maximum correction value utilized during Bayesian filtering of the at least one document as a function of a correction value utilized during Bayesian filtering of the at least one document and the maximum correction value for the at least one document.

4. The method of claim 3 wherein the zero count value further comprises a special value to use during Bayesian filtering for words not encountered during Bayesian filter training, the method further comprising:
calculating the zero count value as a natural logarithm of one divided by the number of words in the training data set multiplied by a constant.

5. The method of claim 3 wherein the correction value utilized during Bayesian filtering of the at least one document further comprises:
a special value calculated to prevent any individual word from unduly influencing classification of the at least one document.

6. The method of claim 1 wherein the at least one document comprises at least one email message and the Bayesian filtering classifies the at least one email message as belonging to a single category from a group of categories consisting of:
spam;
legitimate email; and
unknown.

7. At least one non-transitory computer readable medium containing a computer program product for reducing false classifications during Bayesian filtering, the computer program product comprising:
program code for, within a context of Bayesian filtering, analyzing content of at least one document to be classified;
program code for determining whether more than a threshold amount of the content of the at least one document is known, wherein the program code for determining whether more than a threshold amount of the content of the at least one document is known further comprises program code for performing at least one step from a group of steps consisting of:
determining a percentage of words of the at least one document that are known from Bayesian filter training; and
determining a percentage of a maximum correction value utilized during Bayesian filtering of the at least one document; and
program code for classifying the document responsive to results of the determination.

8. The computer program product of claim 7 wherein the program code for classifying the document responsive to results of the determination further comprises program code for performing a step from a group of steps consisting of:
responsive to determining that more than a threshold amount of the content of the document is not known, classifying the document as being of an unknown type; and
responsive to determining that less than a threshold amount of the content of the document is not known, classifying the document according to results of standard Bayesian filtering.

9. The computer program product of claim 7 wherein the program code for determining a percentage of a maximum correction value utilized during Bayesian filtering of the at least one document further comprises:
program code for calculating the maximum correction value for the at least one document as a function of a zero count value and a number of words in the at least one document; and
program code for calculating a percentage of the maximum correction value utilized during Bayesian filtering of the at least one document as a function of a correction value utilized during Bayesian filtering of the at least one document and the maximum correction value for the at least one document.

10. The computer program product of claim 9 wherein the zero count value further comprises a special value to use during Bayesian filtering for words not encountered during Bayesian filter training, the computer program product further comprising:
program code for calculating the zero count value as a natural logarithm of one divided by the number of words in the training data set multiplied by a constant.

11. The computer program product of claim 9 wherein the correction value utilized during Bayesian filtering of the at least one document further comprises:
a special value calculated to prevent any individual word from unduly influencing classification of the at least one document.

12. The computer program product of claim 7 further comprising program code for classifying at least one email message as belonging to a single category from a group of categories consisting of:
spam;
legitimate email; and
unknown.

13. A computer system for reducing false classifications during Bayesian filtering, the computer system comprising:
a portion for, within a context of Bayesian filtering, analyzing content of at least one document to be classified;
a portion for determining whether more than a threshold amount of the content of the at least one document is known, wherein the portion for determining whether more than a threshold amount of the content of the at least one document is known further comprises a portion for performing at least one step from a group of steps consisting of:
determining a percentage of words of the at least one document that are known from Bayesian filter training; and
determining a percentage of a maximum correction value utilized during Bayesian filtering of the at least one document; and
a portion for classifying the document responsive to results of the determination.

14. The computer system of claim 13 wherein the portion for classifying the document responsive to results of the determination further comprises a portion for performing a step from a group of steps consisting of:
responsive to determining that more than a threshold amount of the content of the document is not known, classifying the document as being of an unknown type; and responsive to determining that less than a threshold amount of the content of the document is not known, classifying the document according to results of standard Bayesian filtering.

15. The computer system of claim 13 wherein the portion for determining a percentage of a maximum correction value utilized during Bayesian filtering of the at least one document further comprises:
 a portion for calculating the maximum correction value for the at least one document as a function of a zero count value and a number of words in the at least one document; and
 a portion for calculating a percentage of the maximum correction value utilized during Bayesian filtering of the at least one document as a function of a correction value utilized during Bayesian filtering of the at least one document and the maximum correction value for the at least one document.

16. The computer system of claim 15 wherein the zero count value further comprises a special value to use during Bayesian filtering for words not encountered during Bayesian filter training, the computer system further comprising:
 a portion for calculating the zero count value as a natural logarithm of one divided by the number of words in the training data set multiplied by a constant.

17. The computer system of claim 13 further comprising a portion for classifying at least one email message as belonging to a single category from a group of categories consisting of:
 spam;
 legitimate email; and
 unknown.

* * * * *